US012614418B1

(12) United States Patent
van Dijk et al.

(10) Patent No.: US 12,614,418 B1
(45) Date of Patent: Apr. 28, 2026

(54) SYSTEMS AND METHODS FOR QUERYING FLIGHT DATA FROM AIRCRAFT

(71) Applicant: Daedalean AG, Zurich (CH)

(72) Inventors: Luuk Adriaan Cornelis van Dijk, Bellinzona (CH); Boris Ivov Videnov, Zurich (CH); Hugo Fernando Lusquiños Silva, Stans (CH); Laura Theresa Eckhardt, Zurich (CH); Boris Andrea Schlapbach Kaeppeli, Hausen am Albis (CH)

(73) Assignee: Daedalean AG, Zurich (CH)

( * ) Notice: Subject to any disclaimer, the term of this patent is extended or adjusted under 35 U.S.C. 154(b) by 596 days.

(21) Appl. No.: 17/706,251

(22) Filed: Mar. 28, 2022

(51) Int. Cl.
| | |
|---|---|
| *G08G 5/26* | (2025.01) |
| *G06F 16/2453* | (2019.01) |
| *G07C 5/00* | (2006.01) |
| *G07C 5/08* | (2006.01) |

(52) U.S. Cl.
CPC ....... *G07C 5/0841* (2013.01); *G06F 16/2453* (2019.01); *G07C 5/008* (2013.01); *G08G 5/26* (2025.01)

(58) Field of Classification Search
CPC ... G07C 5/0841; G07C 5/008; G06F 16/2453; G08G 5/0013
See application file for complete search history.

(56) References Cited

U.S. PATENT DOCUMENTS

| | | | |
|---|---|---|---|
| 6,438,702 B1 * | 8/2002 | Hodge | .................. H04J 3/0667 |
| | | | 713/400 |
| 2015/0029954 A1 * | 1/2015 | Victor | ................. H04L 12/5692 |
| | | | 370/329 |
| 2020/0145623 A1 * | 5/2020 | Sadanand | .............. G06V 20/46 |
| 2022/0014591 A1 * | 1/2022 | Zhong | ................. H04L 41/0816 |
| 2023/0366775 A1 * | 11/2023 | Seng | ..................... G05D 1/0088 |

FOREIGN PATENT DOCUMENTS

| | | | |
|---|---|---|---|
| CN | 107493419 A | * 12/2017 | ........... H04N 5/2251 |

OTHER PUBLICATIONS https://electrek.co/2020/10/24/tesla-collecting-insane-amount-data-full-self-driving-test-fleet/.

* cited by examiner

*Primary Examiner* — Ramya P Burgess
*Assistant Examiner* — Chanmin Park
(74) *Attorney, Agent, or Firm* — Esplin & Associates, PC

(57) ABSTRACT

Systems and methods to query flight data from aircraft are disclosed. Exemplary implementations may receive a notification from a particular aircraft; obtain low-bandwidth flight data from the particular aircraft; determine one or more events of interest that involved the particular aircraft, based on the low-bandwidth data as obtained; transfer a query to provide particular high-bandwidth flight data; obtain a set of aircraft-specific high-bandwidth flight data; store the set of aircraft-specific high-bandwidth flight data as obtained, and/or take other actions based on the aircraft-specific high-bandwidth flight data as obtained.

25 Claims, 3 Drawing Sheets

*Fig. 1*

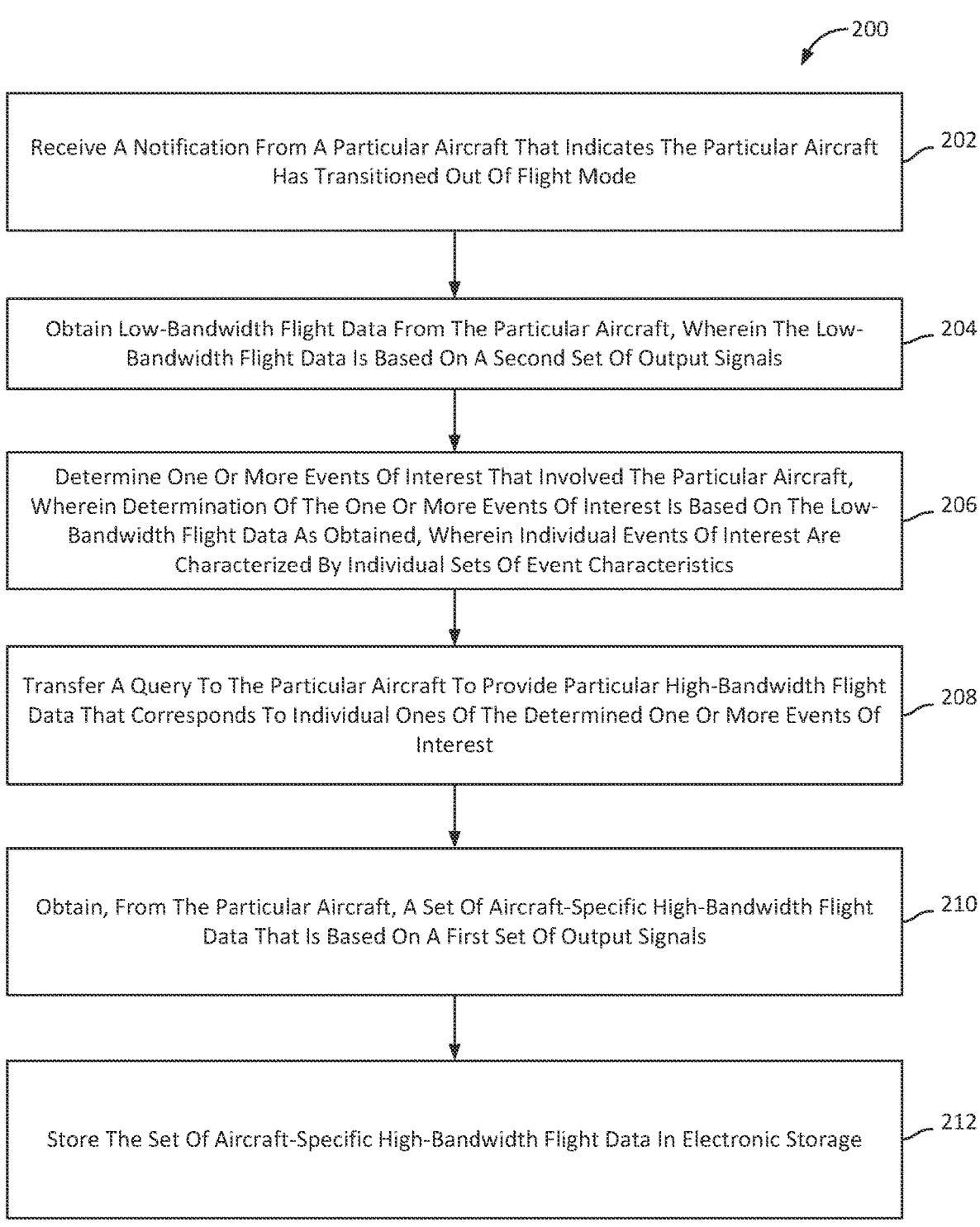

200

Receive A Notification From A Particular Aircraft That Indicates The Particular Aircraft Has Transitioned Out Of Flight Mode — 202

Obtain Low-Bandwidth Flight Data From The Particular Aircraft, Wherein The Low-Bandwidth Flight Data Is Based On A Second Set Of Output Signals — 204

Determine One Or More Events Of Interest That Involved The Particular Aircraft, Wherein Determination Of The One Or More Events Of Interest Is Based On The Low-Bandwidth Flight Data As Obtained, Wherein Individual Events Of Interest Are Characterized By Individual Sets Of Event Characteristics — 206

Transfer A Query To The Particular Aircraft To Provide Particular High-Bandwidth Flight Data That Corresponds To Individual Ones Of The Determined One Or More Events Of Interest — 208

Obtain, From The Particular Aircraft, A Set Of Aircraft-Specific High-Bandwidth Flight Data That Is Based On A First Set Of Output Signals — 210

Store The Set Of Aircraft-Specific High-Bandwidth Flight Data In Electronic Storage — 212

*Fig. 2*

SYSTEMS AND METHODS FOR QUERYING FLIGHT DATA FROM AIRCRAFT

FIELD OF THE DISCLOSURE

The present disclosure relates to systems and methods to query flight data from aircraft, based on distinctions between different types of flight data.

BACKGROUND

Aircraft are known. Aircraft producing flight data during flights is known. Offloading flight data from aircraft, for example through wireless communication with some external device, server, or electronic storage is known.

SUMMARY

One aspect of the present disclosure relates to a system configured to for querying particular flight data from aircraft. A particular aircraft may include a first set of sensors configured to generate a first set of output signals having a first combined bandwidth exceeding, e.g., 1 Gb/s and a second set of sensors configured to generate a second set of output signals having a second combined bandwidth less than, e.g., 1 Gb/s. The first set of output signals convey high-bandwidth flight data. The second set of output signals convey low-bandwidth flight data. The system may be configured to electronic storage configured to electronically store information. The system may include one or more hardware processors configured by machine-readable instructions. The system may be configured to receive a notification from the particular aircraft that indicates the particular aircraft has transitioned out of flight mode. The system may be configured to obtain low-bandwidth flight data from the particular aircraft. The low-bandwidth flight data is based on the second set of output signals. The system may be configured to determine one or more events of interest that involved the particular aircraft. Determination of the one or more events of interest is based on the low-bandwidth flight data as obtained. Individual ones of the one or more events of interest are characterized by individual sets of one or more event characteristics. The system may be configured to transfer a query to the particular aircraft to provide particular high-bandwidth flight data that corresponds to individual ones of the determined one or more events of interest. The system may be configured to as a response to the query, obtain, from the particular aircraft, a set of aircraft-specific high-bandwidth flight data that is based on the first set of output signals. The system may be configured to store the set of aircraft-specific high-bandwidth flight data in the electronic storage.

Another aspect of the present disclosure related to a method of querying particular flight data from aircraft. A particular aircraft includes a first set of sensors that generate a first set of output signals having a first combined bandwidth exceeding a particular bandwidth threshold and a second set of sensors that generate a second set of output signals having a second combined bandwidth less than the particular bandwidth threshold. The first set of output signals convey high-bandwidth flight data. The second set of output signals convey low-bandwidth flight data. The method may include receiving a notification from the particular aircraft that indicates the particular aircraft has transitioned out of flight mode. The method may include obtaining low-bandwidth flight data from the particular aircraft. The low-bandwidth flight data is based on the second set of output signals. The method may include determining one or more events of interest that involved the particular aircraft. Determination of the one or more events of interest is based on the low-bandwidth flight data as obtained. Individual ones of the one or more events of interest are characterized by individual sets of one or more event characteristics. The method may include transferring a query to the particular aircraft to provide particular high-bandwidth flight data that corresponds to individual ones of the determined one or more events of interest. The method may include obtaining a response to the query, obtaining, from the particular aircraft, a set of aircraft-specific high-bandwidth flight data that is based on the first set of output signals. The method may include storing the set of aircraft-specific high-bandwidth flight data in electronic storage.

As used herein, any association (or relation, or reflection, or indication, or correspondency, or correlation) involving aircraft, servers, processors, client computing platforms, users, sensors, cameras, output signals, events, queries, instructions, identifiers, notifications, determinations, distributions, transfers, presentations, interfaces, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 1 illustrates a system configured to query flight data from aircraft, in accordance with one or more implementations.

FIG. 2 illustrates a method of querying flight data from aircraft, in accordance with one or more implementations.

DETAILED DESCRIPTION

Figure 1:
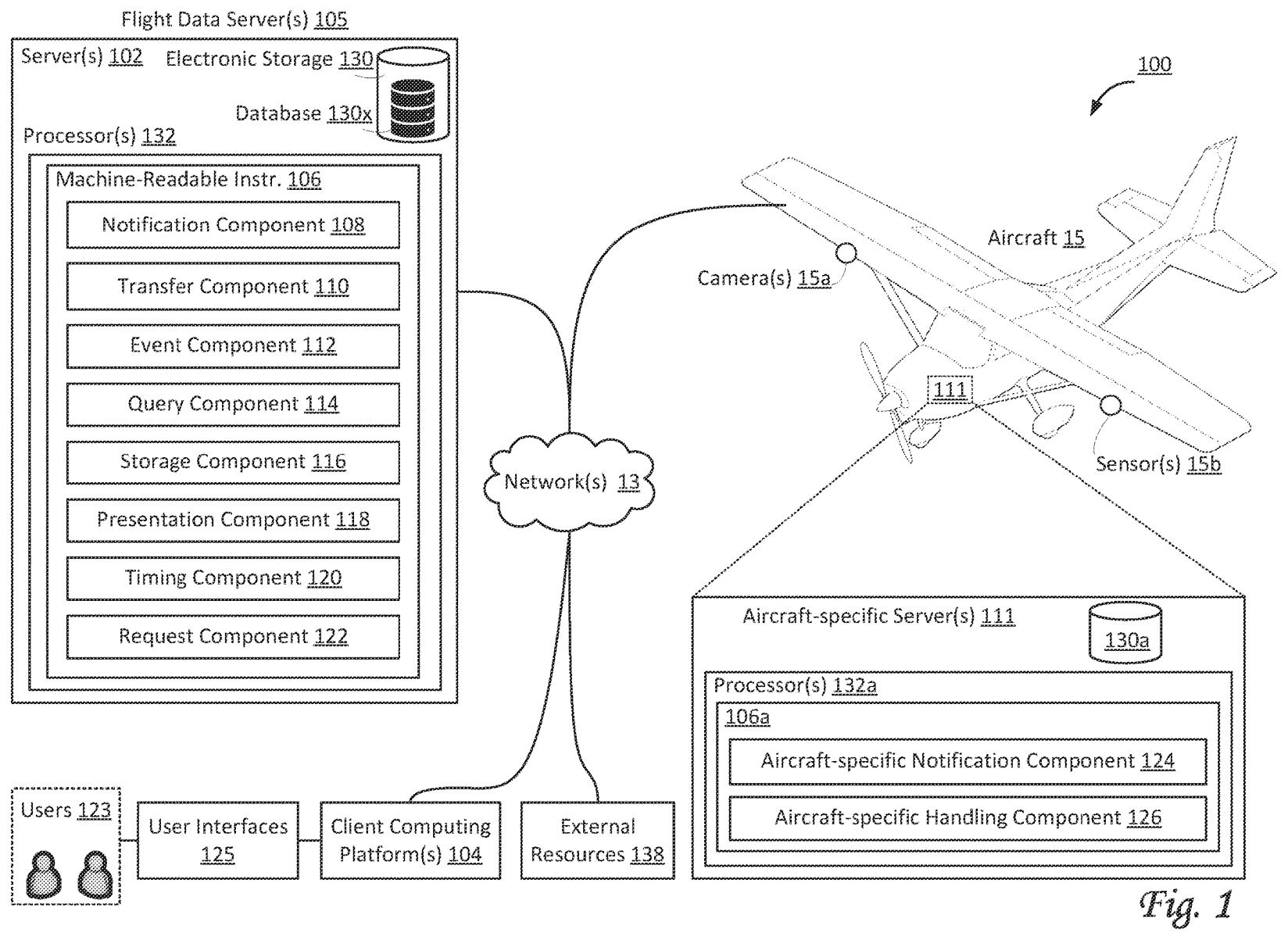
Figure 3A:
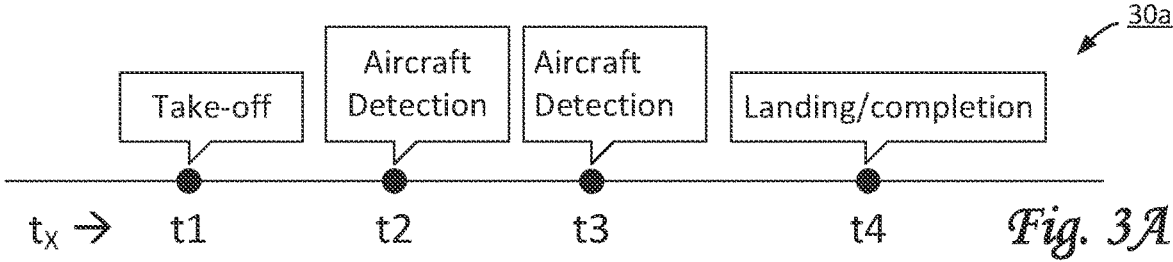
FIGS. 3A-3B illustrate exemplary timelines depicting events of interest as may be used in a system configured to query flight data from aircraft, in accordance with one or more implementations.

FIG. 1 illustrates a system 100 configured for querying particular flight data from aircraft, e.g., a particular aircraft 15, in accordance with one or more implementations. As a preliminary and non-limiting example, by virtue of the systems and methods described in this disclosure, system 100 may query and/or otherwise request specific flight data from one or more aircraft including aircraft 15, based on events of interest that involved the one or more aircraft. For example, aircraft 15 may generate, capture, and/or otherwise produce a large amount of data during operation of aircraft 15. This large amount of data may include flight data that corresponds to events of interest (e.g., particular moments during flight). For reasons explained elsewhere in this disclosure, the entirety of this produced flight data may be too large to share and/or store with servers (e.g., one or more flight data servers 105) and/or other external resources that are remote from aircraft 15. Accordingly, a specific subset of this produced flight data may be shared and/or stored instead. In some implementations, aircraft 15 may support autonomous flight control. Alternatively, and/or simultaneously, in some cases, aircraft 15 may support pilot assistance, in particular non-autonomous pilot assistance or, in other words, assisted flight control. Even though a single aircraft 15 is depicted in FIG. 1, system 100 may operate with a fleet of aircraft that includes aircraft 15. By way of non-limiting example, aircraft 15 may be a vertical takeoff and landing (VTOL) vehicle.

Aircraft 15 may include a first set of sensors configured to generate a first set of output signals conveying (a particular type of) flight data. The first set of output signals may have a combined bandwidth exceeding a particular (high) bandwidth threshold. For example, in some implementations, this bandwidth threshold may be 100 MB/s, 1 GB/s, 10 GB/s, 100 GB/s, and/or another bandwidth threshold. The first set of sensors includes one or more video cameras such as video camera(s) 15a. In some implementations, aircraft 15 may include 2, 3, 4, or more video cameras. An individual video camera may have a resolution of about 6 Mpixel/frame, about 8 Mpixel/frame, about 10 Mpixel/frame, about 12 Mpixel/frame, about 15 Mpixel/frame, about 20 Mpixel/frame, and/or another resolution. An individual video camera may have a frame rate of about 6 frames per second (fps), about 10 fps, about 20 fps, about 30 fps, about 40 pfs, about 60 fps, and/or another frame rate. Individual pixels may use 8 bits, 10 bits, 12 bits, 16 bits, 20 bits, 24 bits, 32 bits, and/or another number of bits per pixel. Accordingly, in case aircraft 15 uses four video cameras at 12 Mpixel/frame, at 30 fps and 12 bits/pixel, the total data rate for the flight data, including the data from these video cameras, may be about 20 Gb/s. In some implementations, the total data rate for the flight data, including the data from the one or more video cameras of aircraft 15 may be more than 1 GB/s, about 2 GB/s, about 5 GB/s, about 10 GB/s, about 20 GB/s, about 30 GB/s, about 40 GB/s, about 50 GB/s, about 60 GB/s, and/or another total data rate.

Flight data conveyed by the first set of sensors may be referred to as high-bandwidth flight data, by virtue of its combined bandwidth exceeding the particular bandwidth threshold. The amount of flight data produced during the entirety of a particular flight could easily be terabytes of data, and too large to share with flight data server 105, either during or after a flight. Often, aircraft power down completely soon (e.g., within 5, 10, 15, 20 minutes or another duration) after completing a flight such that a transfer of flight data needs to occur before this power down. The flight data may be valuable and/or otherwise relevant for different reasons, including but not limited to (i) providing proof as to actions taken or recommended during pertinent moments of a flight, (ii) providing training materials and/or training information that can be used to train autonomous flight control and/or assisted flight control (including but not limited to VTOL aircraft), (iii) providing testing scenarios and/or testing information that can be used to test autonomous flight control and/or assisted flight control, (iv) monitoring performance of autonomous flight control and/or assisted flight control, and/or other reasons making real-world flight data precious.

Aircraft 15 may include a second set of sensors configured to generate a second set of output signals conveying (another particular type of) flight data. Note, this flight data is distinct and different from the flight data corresponding to the first set of sensors. The second set of sensors may include sensor(s) 15b such as, e.g., an altimeter, an airspeed sensor, a compass, etc. The second set of output signals may have a combined bandwidth not to exceed a particular (low) bandwidth threshold. For example, in some implementations, this bandwidth threshold may be 100 MB/s, 1 GB/s, 10 GB/s, 100 GB/s, and/or another bandwidth threshold. In some implementations, the same bandwidth threshold may be used for the first set of sensors and the second set of sensors such that individual sensors of aircraft 15 are either categorized as part of the first set of sensors (and conveying high-bandwidth flight data, such as camera(s) 15a) or categorized as part of the second set of sensors (and conveying low-bandwidth flight data, such as sensor(s) 15b). In other words, the first and second set of sensors may be mutually exclusive. Flight data conveyed by the second set of sensors may be referred to as low-bandwidth flight data, by virtue of its combined bandwidth failing to exceed the particular bandwidth threshold. By way of non-limiting example, this low-bandwidth flight data may include one or more of positional information for aircraft 15 (e.g., global positioning system (GPS) information such as GPS coordinates), location information regarding geographical locations of aircraft 15, information regarding presence of other aircraft (e.g., during active flight), Automatic Dependent Surveillance-Broadcast (ads-b) information (In and/or Out), radar and/or flight alarm (FLARM) information, Traffic Alert and Collision Avoidance System (TCAS) information, lowest selectable speed (VLS) information, instrument read-out information for aircraft (e.g., altimeter, airspeed, compass, etc.), timing information, and/or other aircraft-specific information related to aircraft 15.

System 100 may include one or more flight data servers 105, aircraft-specific server(s) 111, client computing platform(s) 104, user interface(s) 125, server(s) 102, external resource(s) 138, and/or other components. Users 123 (also referred to as users) may include one or more of a first user, a second user, a third user, and/or other users. Users 123 may include users who use flight data server 105, directly or indirectly. As used in descriptions herein, any use of the term "user" may refer to user(s) 123, unless indicated otherwise. In some implementations, system 100 may include one or more aircraft, such as aircraft 15.

As depicted in FIG. 1, aircraft-specific server 111 may include one or more of electronic storage 130a, a set of processors 132a, machine-readable instructions 106a, and/or other components. Machine-readable instructions 106a may include one or more instruction components. The instruction components may include computer program components. The instruction components may include one or more of an aircraft-specific notification component 124, an aircraft-specific handling component 126, and/or other instruction components.

Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104. In some implementations, system 100 and/or aircraft-specific server(s) 111 may be configured to communicate with one or more of flight data server(s) 105, users 123, and/or other entities and/or components, e.g., through one or more networks 13.

Server(s) 102 may include electronic storage 130, (hardware) processor(s) 132, machine-readable instructions 106, and/or other components. Server(s) 102 may be configured by machine-readable instructions 106. Machine-readable instructions 106 may include one or more instruction components. Instruction components (for any set of machine-readable instructions) may include computer program components. The instruction components may include one or more of a notification component 108, a transfer component 110, an event component 112, a query component 114, a storage component 116, a presentation component 118, a timing component 120, a request component 122, aircraft-specific notification component 124, aircraft-specific handling component 126, and/or other instruction components. Processor(s) 132a may be similar to processor(s) 132 as described elsewhere in this disclosure, though included in aircraft-specific server(s) 111, as depicted in FIG. 1. Machine-readable instructions 106a may be similar to machine-readable instructions 106 as described elsewhere in this disclosure, though included in aircraft-specific server(s) 111, as depicted in FIG. 1.

Notification component 108 may be configured to receive notifications, requests, and/or instructions from different aircraft. For example, notification component 108 may receive a notification from a particular aircraft. In some implementations, the notification may indicate the particular aircraft has just arrived at its (current) destination. In some implementations, the notification may indicate the particular aircraft has completed a particular flight. In some implementations, the notification may indicate the particular aircraft has transitioned from a one mode of operation (e.g., active flight, or landing) to another mode of operation (e.g., a non-flight mode of operation, or taxiing, or post-flight parking, or disembarking, or another mode of operation that may follow a landing or that may follow an active flight mode). As used herein, the phrase "active flight" may refer to an aircraft being in (self-propelled) motion, including but not limited to taking off, being airborne, and landing. For example, upon completion of a landing, active flight may be considered over, even if the aircraft has not powered down/off yet. As another example, being parked/landed on a moving superyacht would not be considered active flight.

In some implementations, a pilot or crew of the particular aircraft may signal or initiate the transition to another mode of operation (i.e., after active flight). In some implementations, the particular aircraft itself may (e.g., autonomously) transition to another mode of operation (i.e., after active flight). In some implementations, the notification may indicate the particular aircraft has established a particular type of communication channel, e.g., a communication channel having at least a predetermined bandwidth (either during active flight, or, in some cases, after active flight). By way of non-limiting example, the particular type of communication channel may be characterized by a wireless (e.g., Wi-Fi) connection having at least a 100 MB/s bandwidth on average. In other cases, a communication channel may have at least a 200 MB/s bandwidth, at least a 400 MB/s bandwidth, at least a 1 GB/s bandwidth, at least a 10 GB/s bandwidth, at least a 20 GB/s bandwidth, a range of bandwidth between 100-500 MB/s, a range of bandwidth between 250-750 MB/s, a range of bandwidth between 5-20 GB/s, and/or another particular bandwidth (or threshold) of bandwidth suitable for the transfer of aircraft-specific flight data as described elsewhere in this disclosure. For example, this particular type of communication channel may be referred to as a high-speed communication channel. Commonly, for most aircraft, such a high-speed communication channel will not be available during (most of) active flight mode. By way of non-limiting example, a particular transfer (which requires such a high-speed communication channel) may involve 5 GB of data being transferred within 1 minute, 10 GB of data being transferred within 2 minutes, 100 GB of data being transferred within 5 minutes, 200 GB of data being transferred within 10 minutes, and/or another amount of data being delivered within another duration of time. In particular, in some implementations, the amount of data to be transferred and the time limit for such a transfer commonly render cellular communication standards such as 3G or LTE insufficient due to low bandwidth.

Transfer component 110 may be configured to obtain flight data from aircraft. By way of non-limiting example, transfer component 110 may obtain (aircraft-specific) low-bandwidth flight data from aircraft 15. In particular, the obtained low-bandwidth flight data may be based on (and/or otherwise derived from) the second set of sensors of aircraft 15, including sensor(s) 15b. In some implementations, the low-bandwidth flight data may be obtained subsequent and/or in response to a notification received from aircraft 15, e.g., by notification component 108. In some implementations, the obtained low-bandwidth flight data may be constrained, compressed, and/or otherwise reduced in size prior to transfer. The obtained low-bandwidth flight data may include timing information and/or otherwise be time-stamped. For example, the low-bandwidth flight data requested and/or obtained from aircraft 15 may start at the most recent timestamp for previously received low-bandwidth flight data.

In some implementations, transfer component 110 may be configured to obtain (aircraft-specific) high-bandwidth flight data from aircraft 15. In particular, the obtained high-bandwidth flight data may be based on (and/or otherwise derived from) the first set of sensors of aircraft 15, including camera(s) 15a. In some implementations, the high-bandwidth flight data may be obtained subsequent and/or in response to a query and/or request transferred to aircraft 15, e.g., by query component 114. In some implementations, the obtained high-bandwidth flight data may be constrained, compressed, and/or otherwise reduced in size prior to transfer. For example, in some cases, a particular query may include one or more constraints for the response to the query by aircraft 15.

Event component 112 may be configured to determine events of interest to particular aircraft, e.g., aircraft 15. As used herein, events of interest may be one or more of a particular phase of (flight) operations (such as take-off or landing), a proximity to particular geographical areas (such as a metropolitan area or a military area, or a landmark), a presence of a certain type of object in the air during flight (such as other aircraft, drones, etc.), an alert condition (e.g., collision course, low fuel, visibility issues, etc.), a particular type of maneuver (evasive maneuver, sudden change in altitude, etc.), and/or other types of events. Determinations by event component 112 may be based on flight data, in particular low-bandwidth flight data obtained by transfer component 110 (including corresponding timing information, GPS information, etc.). Individual events may be characterized by event characteristics, which may be specific to the type of event. For example, the event characteristics for proximity to a landmark or entering into a particular geographical area could be GPS coordinates, optionally combined with a particular distance for the relevant proximity. An example might be aircraft 15 being within 1 mile of restricted military airspace. For example, the event characteristics for certain types of object in the air may include which kinds of aircraft (or how to recognize them from analyzing pixels captured by a video camera). For example, the event characteristics for an alert condition may include specific thresholds for parameters that are determined based on sensor output. In some cases, such event characteristics may include a combination of different thresholds being breached and/or different conditions occurring either at the same time, or within a predetermined period (e.g., within 10 seconds, within 20 seconds, within 30 seconds, within a minute, etc.). In some implementations, combinations of different types of events may be characterized by a set of multiple event characteristics, and individual combinations may be considered a new type of event of interest. In some implementations, a set of event characteristics may define a type of event of interest as may be determined by event component 112.

Query component 114 may be configured to create, form, and/or transfer queries. Queries may correspond to events of interest (as determined by event component 112). Query component 114 may transfer a particular query for flight data that corresponds to one or more particular events of interest to aircraft 15. For example, the particular query may request aircraft 15 to provide high-bandwidth flight data for the following events of interest during its most recent completed flight: take-off, landing, and detections of any other aircraft. By way of non-limiting example (and depicted in the exemplary timeline of FIG. 3A), these events may have occurred at times indicated by timestamps "t1", "t2", "t3", and "t4", where "t1" corresponds to take-off, "t2" and "t3" correspond to detections of other aircraft during active flight, and "t4" corresponds to landing. In some implementations, an individual query may be constrained and/or otherwise limited to a particular period. For example, the particular period may be based on the most recent query handled by a particular aircraft. Assume a previous query covered flight data up to noon on Jan. 1, 2023, a subsequent query may start at noon on that date and cover flight data up to the present time. In some implementations, operations by query component 114 may be based on timing information, e.g., time stamps, that may be specific to individual aircraft. In some implementations, queries by query component 114 may include constraints for the response by a particular aircraft. For example, the constraints may pertain to a resolution for image or video information, which may allow captured image or video information to be downsized and/or otherwise reduced for transfer to flight data server 105. For example, the constraints may pertain to color specifics for image or video information (e.g., in some cases, greyscale images may be sufficient), which may allow captured image or video information to be downsized and/or otherwise reduced for transfer to flight data server 105. For example, the constraints may pertain to how long before or after a particular event the image or video information of a particular event of interest should extend (e.g., from 10 seconds before to 10 seconds after an event, or from 30 seconds before to 30 seconds after an event, or from 15 seconds before to 60 seconds after an event, etc.), which may allow captured image or video information to be downsized and/or otherwise reduced for transfer to flight data server 105. For example, the constraints may pertain to a threshold for the amount of data to be transferred to flight data server 105. For example, the constraints may pertain to a threshold for a duration for the transfer of data to flight data server 105. For example, the constraints may pertain to a threshold for the rate of data transfer to flight data server 105. Combinations of multiple constraints are envisioned within the scope of this disclosure. As an example, and in reference to FIG. 3A, a specific query may request high-bandwidth flight data for 3 minutes centered around "t1", 1 minute each centered around "t2" and "t3", and 5 minutes around "t4" (e.g., four minutes before "t4" and 1 minute after "t4"). Accordingly, the events of interest for the particular flight in this example may correspond to flight data including about 10 minutes of high-bandwidth flight data. As another example, the specific query may request a frame rate that is lower (say, 10 fps) than the actually used frame rate of camera 15a (say, 30 fps), to further reduce the required bandwidth and/or amount of data transferred to flight data server 105.

In some implementations, query component 114 may be configured to include a prioritized order of different types of events of interest (i.e., higher priority and lower priority events of interest, or, in some cases, more than 2 levels of priority). A subsequent response by aircraft 15 may take this prioritized order into consideration. For example, a near collision may have a higher priority than proximity to a particular landmark. The high-bandwidth flight data obtained from aircraft 15 may start with higher priority flight data for higher priority events of interest, and may not include all available lower-priority flight data for lower-priority events of interest. For example, due to constraints, some of the lower-priority flight data may not be transferred to flight data server 105 in the same transfer (or at all). The high-bandwidth flight data may be obtained from aircraft 15 in an order that corresponds to the prioritized order.

Storage component 116 may be configured to electronically store information in electronic storage 130, including but not limited to database 130x. For example, storage component 116 may store information obtained by transfer component 110. For example, storage component 116 may store information obtained from aircraft 15. For example, storage component 116 may store aircraft-specific information, including but not limited to flight data. For example, storage component 116 may store obtained low-bandwidth flight data for aircraft 15, obtained high-bandwidth flight data for aircraft 15, and/or other information related to aircraft 15. Storage component 116 may be configured to retrieve and/or otherwise obtain stored information from electronic storage, including but not limited to electronic storage 130 and/or database 130x. For example, retrieved information may include aircraft-specific information.

Timing component 120 may be configured to determine timing information. For example, timing component 120 may determine and/or receive time stamps. In some implementations, particular timing information may be related to a particular query. In some implementations, particular timing information may be related to a particular response to a query, from a particular aircraft. In some implementations, a new query may be based in part on timing information determined (or received) by timing component 120. For example, if a previous response to a query by aircraft 15 covers a period from a first moment to a second moment (perhaps coinciding with a particular flight by aircraft 15), a subsequent query for flight data by the same aircraft 15 may start at the second moment such that the response to this subsequent query does not duplicate flight data that has already been received by flight data server 105. In other words, the particular events of interest that correspond to high-bandwidth flight data for this subsequent query occurred after the second moment. In some implementations, events of interest may be based at least in part on timing information determined by timing component 120.

In some implementations, notifications received by notification component 108 may include timing information, such as time stamps. For example, aircraft 15 may include a time stamp in a notification that reflects the last moment for which (high-bandwidth) flights data has previously been transferred to flight data server 105.

Request component 122 may be configured to transfer instructions, requests, and/or other information to particular aircraft. For example, request component 122 may transfer a particular instruction to aircraft 15 to provide particular low-bandwidth flight data to flight data server 105 (and, in particular, to transfer component 110). In some implementations, the particular instruction may include and/or be based on timing information (e.g., a time stamp by timing component 120). In some implementations, the particular instruction may specify recent GPS information, or recent in-air alerts, or some other type of event. In some implementations, the particular instruction may include event characteristics that constrain the low-bandwidth flight data provided by aircraft 15. For example, the low-bandwidth flight data from aircraft 15 may be based at least in part on an instruction, request, or other information transferred by request component 122 to aircraft 15.

Aircraft-specific notification component 124 may be configured to transfer aircraft-specific notifications, requests, and/or other information from a specific aircraft (e.g., aircraft 15) to flight data server 105 (and, in particular, to notification component 108). For example, the aircraft-specific notification may indicate aircraft 15 has just arrived at its (current) destination. In some implementations, aircraft-specific information transferred by aircraft-specific notification component 124 may include identifying information (e.g., an identifier) that identifies the specific aircraft. In some implementations, aircraft-specific information transferred by aircraft-specific notification component 124 may include timing information, such as time stamps. In some implementations, aircraft-specific information transferred by aircraft-specific notification component 124 may include low-bandwidth flight data. Aircraft-specific notification component 124 may be specific to a single aircraft such as, e.g., aircraft 15.

Aircraft-specific handling component 126 may be configured to receive queries and/or other information from flight data server 105, in particular, from query component 114. Aircraft-specific handling component 126 may be configured to handle and respond to queries, instructions, requests, and/or other information received from flight data server 105. For example, aircraft-specific handling component 126 may receive a particular query for specific high-bandwidth flight data, prepare a response to the particular query, and transfer the response to flight data server 105. In some implementations, aircraft-specific handling component 126 may constrain the response, e.g., in accordance with one or more constraints included in the particular query. In some implementations, aircraft-specific handling component 126 may prioritize different parts of the response, e.g., in accordance with a prioritized order included in the particular query. Aircraft-specific handling component 126 may be specific to a single aircraft such as, e.g., aircraft 15.

Information regarding aircraft may be stored, e.g., in electronic storage 130 and/or in other types of storage. In some implementations, storage component 116 may be configured to store information in electronic storage, including but not limited to electronic storage 130. For example, flight data may be organized in database 130$x$ for future access. Database 130$x$ (which may, for example, be part of electronic storage 130) may be queried for particular flight data of a particular aircraft. In some cases, database 130$x$ may be queried for the most recent timestamp of stored flight data for a particular aircraft. In some cases, the stored flight data for a particular aircraft may be referred to (and/or reconstructed as) a timeline. By way of non-limiting example, FIG. 3A illustrates a particular timeline 30$a$ (with time "t" being specific for aircraft "X" as indicated by the notation of "t$_x$") depicting events of interest as may be used in system 100 (e.g., as determined by event component 112). This timeline shows aircraft "X" took off on time "t1", initiating a particular flight. Furthermore, particular timeline 30$a$ may show this same aircraft detected another aircraft on time "t2" and on time "t3", during active flight. Finally, particular timeline 30$a$ may show this same aircraft landed on time "t4", concluding the particular flight. Note that "t1" precedes "t2", which precedes "t3", which precedes "t4". High-bandwidth flight data corresponding to these four moments may be transferred to flight data server 105 after completion of the particular flight. In some implementations, individual timelines may be stored in (or retrievable from) database 130$x$ in electronic storage 130. In some cases, information that identifies individual events in individual timelines may be stored in and retrievable from database 130$x$. In some implementations, individual timelines may be created, constructed, and/or reconstructed by system 100 based on information retrieved from database 130$x$.

Figure 3B:
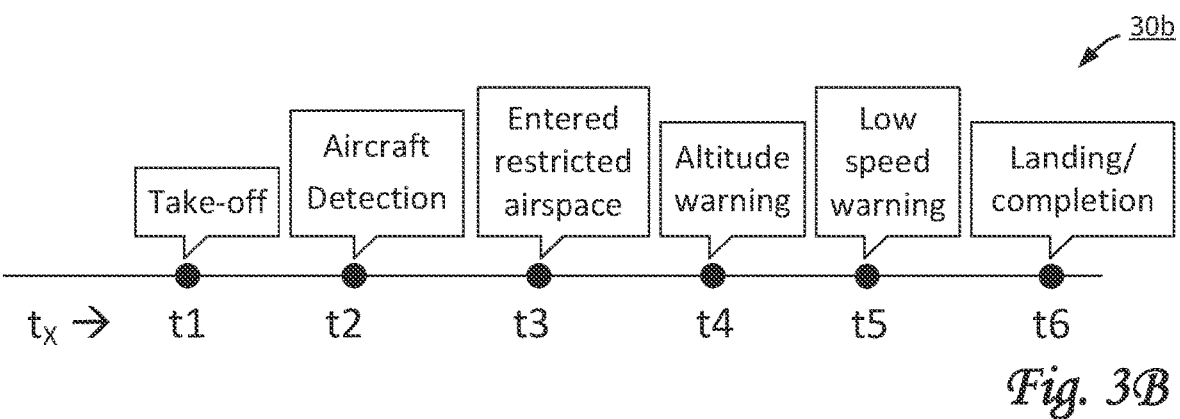

By way of non-limiting example, FIG. 3B illustrates a particular timeline 30$b$ (with time "t" being specific for aircraft "X" as indicated by the notation of "t$_x$") depicting events of interest as may be used in system 100 (e.g., as determined by event component 112). This timeline shows aircraft "X" took off on time "t1", initiating a particular flight. Furthermore, particular timeline 30$b$ may show this same aircraft detected another aircraft on time "t2", entered restricted airspace on time "t3", has an altitude warning on "t4", and experienced a low speed warning on "t5", all during active flight. Finally, particular timeline 30$b$ may show this same aircraft landed on time "t6", concluding the particular flight. High-bandwidth flight data corresponding to these six moments may be transferred to flight data server 105 after completion of the particular flight.

Presentation component 118 may be configured to present interfaces (e.g., user interfaces 125) to users, e.g., through client computing platforms 104 associated with the respective users. In some implementations, presentation component 118 may be configured to effectuate a presentation of a user interface to user of flight data server 105. For example, a user may enter and/or select (types of) events of interest, event characteristics, constraints, and/or other relevant information that may be used to generate a query, create or transfer a response to a query, store information in electronic storage based on obtained flight data, and/or perform other actions attributed to system 100. In some implementations, system 100 may be configured to control actions based on determinations (or received information) by components of system 100. In some implementations, the actions may include a notification of a particular user. In some cases, system 100 may recommend an action based on the result of a determination, e.g., to further investigate events that occurred during a flight.

Referring to FIG. 1, user interfaces 125 may be configured to facilitate interaction between users 123 and system 100 and/or between users 123 and client computing platforms 104. For example, user interfaces 125 may provide an interface through which users 123 may provide information to and/or receive information from system 100. In some implementations, user interface 125 may include one or more of a display screen, touchscreen, monitor, a keyboard, buttons, switches, knobs, levers, mouse, microphones, sensors to capture voice commands, sensors to capture body movement, sensors to capture hand and/or finger gestures, and/or other user interface devices configured to receive and/or convey user input. In some implementations, one or more user interfaces 125 may be included in one or more client computing platforms 104. In some implementations, one or more user interfaces 125 may be included in system 100. In some implementations, user interface 125 may be a type of interface that facilitates the presentation of information regarding events of interest, e.g., depicted as a timeline.

Referring to FIG. 1, in some implementations, flight data servers 105, server(s) 102, client computing platform(s) 104, aircraft-specific servers 111, and/or external resources 138 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which flight data servers 105, server(s) 102, client computing platform(s) 104, aircraft-specific servers 111, and/or external resources 138 may be operatively linked via some other communication media.

A given client computing platform 104 may include one or more processors configured to execute computer program components. The computer program components may be configured to enable an expert or user associated with the given client computing platform 104 to interface with system 100 and/or external resources 138, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms. In some implementations, individual client computing platforms 104 may be configured to determine geolocation information for a current location of the individual client computing platforms 104.

External resources 138 may include sources of information outside of system 100, external entities participating with system 100 (including third parties such as external web-servers), external providers of computation and/or storage services (e.g., a server external to system 100), external providers of relevant information (e.g., flight scheduling information, weather information, etc.), and/or other resources. In some implementations, some or all of the functionality attributed herein to external resources 138 may be provided by resources included in system 100. In some implementations, one or more external resources 138 may provide information to other components of system 100.

Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein. Electronic storage 130a may be similar to electronic storage 130 as described elsewhere in this disclosure, though included in aircraft-specific servers 111, as depicted in FIG. 1.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, 116, 118, 120, 122, 124, and/or 126, and/or other components. Processor(s) 132 may be configured to execute components 108, 110, 112, 114, 116, 118, 120, 122, 124, and/or 126, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, 122, 124, and/or 126 are illustrated in FIG. 1 as being implemented within two separate processing units, this is exemplary. In implementations in which processor(s) 132 and/or processor(s) 132 include multiple processing units, one or more of components 108, 110, 112, 114, 116, 118, 120, 122, 124, and/or 126 may be implemented remotely from the other components. The description of the functionality provided by the different components 108, 110, 112, 114, 116, 118, 120, 122, 124, and/or 126 described below is for illustrative purposes only, and is not intended to be limiting, as any of components 108, 110, 112, 114, 116, 118, 120, 122, 124, and/or 126 may provide more or less functionality than is described. For example, one or more of components 108, 110, 112, 114, 116, 118, 120, 122, 124, and/or 126 may be eliminated, and some or all of its functionality may be provided by other ones of components 108, 110, 112, 114, 116, 118, 120, 122, 124, and/or 126. As another example, processor(s) 132 may be configured to execute one or more additional components that may perform some or all of the functionality attributed below to one of components 108, 110, 112, 114, 116, 118, 120, 122, 124, and/or 126.

FIG. 2 illustrates a method 200 of querying flight data from aircraft, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, a notification is received from a particular aircraft that indicates the particular aircraft has transitioned out of flight mode. The particular aircraft includes a first set of sensors that generates a first set of output signals having a first combined bandwidth exceeding a particular bandwidth threshold (e.g., 1 Gb/s) and a second set of sensors that generate a second set of output signals having a second combined bandwidth less than the particular bandwidth threshold. The first set of output signals convey high-bandwidth flight data. The second set of output signals convey low-bandwidth flight data. In some embodiments, operation 202 is performed by a notification component the same as or similar to notification component 108 (shown in FIG. 1 and described herein).

At an operation 204, low-bandwidth flight data is obtained from the particular aircraft. The low-bandwidth flight data is based on the second set of output signals. In some embodiments, operation 204 is performed by a transfer component the same as or similar to transfer component 110 (shown in FIG. 1 and described herein).

At an operation 206, one or more events of interest are determined that involved the particular aircraft. Determination of the one or more events of interest is based on the low-bandwidth flight data as obtained. Individual ones of the one or more events of interest are characterized by individual sets of one or more event characteristics. In some embodiments, operation 206 is performed by an event component the same as or similar to event component 112 (shown in FIG. 1 and described herein).

At an operation 208, a query is transferred to the particular aircraft to provide particular high-bandwidth flight data that corresponds to individual ones of the determined one or more events of interest. In some embodiments, operation 208 is performed by a query component the same as or similar to query component 114 (shown in FIG. 1 and described herein).

At an operation 210, as a response to the query, a set of aircraft-specific high-bandwidth flight data is obtained from the particular aircraft, based on the first set of output signals. In some embodiments, operation 210 is performed by a transfer component the same as or similar to transfer component 110 (shown in FIG. 1 and described herein).

At an operation 212, the set of aircraft-specific high-bandwidth flight data is stored in electronic storage. In some embodiments, operation 212 is performed by a storage component the same as or similar to storage component 116 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. It is to be understood that the present technology contemplates that, to the extent possible, one or more features of any implementation can be combined with features of any other implementation.

What is claimed is:

1. A system configured for electronically transferring particular flight data from a fleet of aircraft, the system comprising:
   a particular aircraft included in the fleet of aircraft, wherein the particular aircraft includes:
      (a) a first set of sensors and, wherein the first set of sensors is configured to generate a first set of output signals having a first combined bandwidth exceeding 1 Gb/s, wherein the first set of output signals convey high-bandwidth flight data,
      (b) a second set of sensors and wherein the second set of sensors is configured to generate a second set of output signals having a second combined bandwidth less than 1 Gb/s, wherein the first set of sensors is different from the second set of sensors, wherein the second set of output signals convey low-bandwidth flight data, and
      (c) a set of one or more processors;
   electronic storage configured to electronically store information, wherein the electronic storage is external to the particular aircraft; and
   one or more hardware processors configured by machine-readable instructions to:
      receive, from the set of one or more processors included in the particular aircraft, a notification from the particular aircraft that indicates the particular aircraft has transitioned to a non-flight mode of operation but not yet powered down, and that further indicates the particular aircraft has established a communication channel for the electronic transfer of a portion of the low-bandwidth flight data and a portion of the high-bandwidth flight data;
      receive, through the communication channel and from the set of one or more processors included in the particular aircraft, the low-bandwidth flight data from the particular aircraft, wherein the low-bandwidth flight data is based on the second set of output signals;

determine, by the one or more hardware processors, events of interest that involved the particular aircraft and another aircraft that has been detected during flight, wherein determination of the events of interest is based on the low-bandwidth flight data as received, wherein individual ones of the determined events of interest are characterized by individual sets of one or more event characteristics for the second set of output signals that convey the low-bandwidth flight data, and wherein the individual ones of the determined events of interest are associated with individual sets of timing information;

generate a request for the particular aircraft based on the determined events of interest, wherein the request is for the particular aircraft to provide at least part of the high-bandwidth flight data that corresponds to the individual ones of the determined events of interest, wherein the request includes the individual sets of timing information that are associated with the individual ones of the determined events of interest;

electronically transfer, by the one or more hardware processors, the request as generated to the particular aircraft, wherein the request includes the individual sets of timing information that are associated with the individual ones of the determined events of interest;

as a response to the request, receive, through the communication channel and from the set of one or more processors included in the particular aircraft, the at least part of the high-bandwidth flight data that:

(i) is based on the first set of output signals, and (ii) corresponds to the individual ones of the determined events of interest and the individual sets of timing information that are associated with the individual ones of the determined events of interest; and store the at least part of the high-bandwidth flight data in the electronic storage.

2. The system of claim 1, wherein the first set of output signals include video information captured by one or more video cameras that are carried by the particular aircraft.

3. The system of claim 1, wherein the second set of output signals include at least one of location information regarding geographical locations of the particular aircraft and information regarding presence of other aircraft.

4. The system of claim 1, wherein the notification indicates the particular aircraft has completed a particular flight.

5. The system of claim 1, wherein the one or more hardware processors are further configured to:

determine timing information related to a previous response to a previous request to provide for certain flight data from the particular aircraft, wherein the individual ones of the determined events of interest occurred after the previous response.

6. The system of claim 5, wherein the one or more hardware processors are further configured to:

transfer an instruction to the particular aircraft to provide particular low-bandwidth flight data, wherein the instruction is based on the timing information, wherein the low-bandwidth flight data as received from the particular aircraft is based on the instruction.

7. The system of claim 5, wherein the request is based on the determined timing information.

8. The system of claim 1, wherein the request includes a prioritized order of the individual ones of the determined events of interest, and wherein the at least part of the high-bandwidth flight data is received in an order that corresponds to the prioritized order included in the request.

9. The system of claim 1, wherein the request includes one or more constraints for the response.

10. The system of claim 1, wherein the individual sets of one or more event characteristics include at least one of:

a first set of one or more event characteristics that characterize a particular geographical area, a second set of one or more event characteristics that characterize a presence of a certain type of object in the air during flight, a third set of one or more event characteristics that characterize a particular phase of a flight, and a fourth set of one or more event characteristics that characterize an alert condition during flight of the particular aircraft.

11. The system of claim 1, wherein the communication channel supports communication that is faster than cellular communication standards.

12. The system of claim 1, wherein the at least part of the high-bandwidth flight data is received from the particular aircraft within 20 minutes of receipt of the notification.

13. The system of claim 1, wherein the particular aircraft is controlled such that the at least part of the high-bandwidth flight data is received from the particular aircraft before the particular aircraft powers down.

14. The system of claim 1, wherein the one or more hardware processors are further configured to:

receive a particular notification from the particular aircraft that indicates the particular aircraft has powered down.

15. The system of claim 1, wherein the determined events of interest include a first event associated with first timing information, wherein the request includes the first timing information, and wherein a portion of the high-bandwidth flight data as received has been selected based on the first timing information.

16. A method of electronically transferring particular flight data from a fleet of aircraft, the method comprising:

generating a first set of output signals, by a first set of sensors that is included in a particular aircraft, wherein the particular aircraft is included in the fleet of aircraft, wherein the first set of output signals have a first combined bandwidth exceeding a particular bandwidth threshold, wherein the first set of output signals convey high-bandwidth flight data;

generating a second set of output signals, by a second set of sensors that is included in the particular aircraft and that is different from the first set of sensors, wherein the second set of output signals have a second combined bandwidth less than the particular bandwidth threshold, wherein the second set of output signals convey low-bandwidth flight data;

receiving a notification from the particular aircraft that indicates the particular aircraft has transitioned to a non-flight mode of operation but not yet powered down, and that further indicates the particular aircraft has established a communication channel for the electronic transfer of a portion of the low-bandwidth flight data and a portion of the high-bandwidth flight data;

receiving, through the communication channel, the low-bandwidth flight data from the particular aircraft, wherein the low-bandwidth flight data is based on the second set of output signals;

determining, by one or more hardware processors, events of interest that involved the particular aircraft and another aircraft that has been detected during flight, wherein determination of the events of interest is based on the low-bandwidth flight data as received, wherein individual ones of the determined events of interest are characterized by individual sets of one or more event characteristics for the second set of output signals that convey the low-bandwidth flight data, and wherein the individual ones of the determined events of interest are associated with individual sets of timing information;

generating, by the one or more hardware processors, a request for the particular aircraft based on the determined events of interest, wherein the request is for the particular aircraft to provide at least part of the high-bandwidth flight data that corresponds to the individual ones of the determined events of interest, wherein the request includes the individual sets of timing information that are associated with the individual ones of the determined events of interest;

electronically transferring, by the one or more hardware processors, the request as generated to the particular aircraft, wherein the request includes the individual sets of timing information that are associated with the individual ones of the determined events of interest;

as a response to the request, receiving, through the communication channel and from the particular aircraft, the at least part of the high-bandwidth flight data that:

(i) is based on the first set of output signals, and (ii) corresponds to the individual ones of the determined events of interest and the individual sets of timing information that are associated with the individual ones of the determined events of interest; and storing the at least part of the high-bandwidth flight data in electronic storage.

17. The method of claim 16, wherein the particular bandwidth threshold is 1 GB/s, wherein the first set of output signals include video information captured by one or more video cameras that are carried by the particular aircraft, and wherein the second set of output signals do not include any video information captured by the one or more video cameras.

18. The method of claim 16, wherein the second set of output signals include at least one of location information regarding geographical locations of the particular aircraft and information regarding presence of other aircraft.

19. The method of claim 16, wherein the notification indicates the particular aircraft has completed a particular flight.

20. The method of claim 16, further comprising:

determining timing information related to a previous response to a previous request to provide for certain flight data from the particular aircraft.

21. The method of claim 20, further comprising:

transferring an instruction to the particular aircraft to provide particular low-bandwidth flight data, wherein the instruction is based on the timing information, wherein the low-bandwidth flight data as received from the particular aircraft is based on the instruction.

22. The method of claim 20, wherein the request is based on the determined timing information.

23. The method of claim 16, wherein the request includes a prioritized order of the individual ones of the determined events of interest, and wherein the at least part of the high-bandwidth flight data is received in an order that corresponds to the prioritized order included in the request.

24. The method of claim 16, wherein the request includes one or more constraints for the response.

25. The method of claim 16, wherein the individual sets of one or more event characteristics include at least one of:

a first set of event characteristics that characterize a particular geographical area, a second set of event characteristics that characterize a presence of a certain type of object in the air during flight, a third set of event characteristics that characterize a particular phase of a flight, and a fourth set of event characteristics that characterize an alert condition during flight of the particular aircraft.

* * * * *